United States Patent
Yu et al.

(10) Patent No.: US 10,941,078 B2
(45) Date of Patent: Mar. 9, 2021

(54) β-SIALON WAVELENGTH CONVERTERS AND METHODS OF MAKING THE SAME

(71) Applicant: OSRAM Opto Semiconductors GmbH, Regensburg (DE)

(72) Inventors: Zhengbo Yu, Shrewsbury, MA (US); Madis Raukas, Lexington, MA (US); Yi Zheng, Lynnfield, MA (US)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 430 days.

(21) Appl. No.: 15/661,183

(22) Filed: Jul. 27, 2017

(65) Prior Publication Data

US 2019/0031567 A1 Jan. 31, 2019

(51) Int. Cl.
*C04B 35/599* (2006.01)
*C09K 11/08* (2006.01)
(Continued)

(52) U.S. Cl.
CPC ........ *C04B 35/597* (2013.01); *C09K 11/7734* (2013.01); *F21V 9/30* (2018.02); *C04B 2235/3206* (2013.01); *C04B 2235/3222* (2013.01); *C04B 2235/3224* (2013.01); *C04B 2235/3225* (2013.01);
(Continued)

(58) Field of Classification Search
CPC ............ C04B 35/597; C04B 2235/668; C04B 2235/3225; C04B 2235/3222; C04B 2235/9646

See application file for complete search history.

(56) References Cited

U.S. PATENT DOCUMENTS

| 9,133,392 B2 | 9/2015 | Raukas et al. |
| 2013/0106277 A1 | 5/2013 | Ichikawa et al. |

(Continued)

FOREIGN PATENT DOCUMENTS

| EP | 2596080 A1 | 5/2013 |
| JP | 60186469 A * | 9/1985 |
| WO | 2016094863 A1 | 6/2016 |

OTHER PUBLICATIONS

Lee H-L. et al. Thermomechanical Properties of β-Sialon Synthesized from Kaolin. Journal of the American Ceramic Society, 72 [8] 1458-61 (1989). (Year: 1989).*

(Continued)

*Primary Examiner* — Erin Snelting
(74) *Attorney, Agent, or Firm* — Slater Matsil, LLP (57) ABSTRACT

Methods for producing wavelength converters are described. The methods include sintering a mixture consisting essentially of first particles and second particles to form a sintered article. In embodiments the first particles consist essentially of particles of β-SiAlON or precursors thereof, and the second particles consist essentially one or more sintering aids or precursors thereof. In embodiments the sintered article has a density that is greater than or equal to about 90% of a theoretical bulk density of the mixture, and is configured to convert primary light incident thereon to secondary light, wherein the secondary light exhibits a peak with a full width half maximum of greater than 0 to about 60 nanometers (nm) within a wavelength range of about 495 nm to about 600 nm.

16 Claims, 4 Drawing Sheets

(51) Int. Cl.
*C04B 35/597* (2006.01)
*C09K 11/77* (2006.01)
*F21V 9/30* (2018.01)

(52) U.S. Cl.
CPC ............ *C04B 2235/3882* (2013.01); *C04B 2235/5436* (2013.01); *C04B 2235/5445* (2013.01); *C04B 2235/6562* (2013.01); *C04B 2235/6567* (2013.01); *C04B 2235/6582* (2013.01); *C04B 2235/6586* (2013.01); *C04B 2235/666* (2013.01); *C04B 2235/668* (2013.01); *C04B 2235/77* (2013.01); *C04B 2235/9646* (2013.01)

(56) References Cited

U.S. PATENT DOCUMENTS

2017/0018689 A1    1/2017  Yu
2017/0073578 A1*  3/2017  Takahashi ............. C04B 35/597

OTHER PUBLICATIONS

JP S60-186469 A (Nomura) May 21, 1985 (English language machine translation). [online] [retrieved Nov. 20, 2019]. Retrieved from: Espacenet. (Year: 1985).*

* cited by examiner

β-SIALON WAVELENGTH CONVERTERS AND METHODS OF MAKING THE SAME

FIELD

The present disclosure generally relates to wavelength converters and methods of making wavelength converters. More particularly, the present disclosure generally relates to wavelength converters including beta-SiAlON (β-SiAlON) and one or more sintering aids, and methods of forming the same.

BACKGROUND

Radiation emitting components such as light emitting diodes (LEDs) can generate visible or non-visible light in a specific region of the electromagnetic spectrum. Depending on the material composition of an LED, its light output ("i.e., "primary light") may be light in the blue, red, green, non-visible ultra-violet (UV), infrared, and/or near-UV region of the electromagnetic spectrum. Wavelength converters may be used to construct a lighting device that produces a light output that differs from the primary light output of the light source(s) therein. For example a wavelength converter including one or more wavelength conversion materials may be employed to convert all or a portion of light of a first wavelength or wavelength range (the "primary light" or "excitation light") to light of a second wavelength or wavelength range (the "secondary light" or "emission light") using photoluminescence. In such instances, the color of the light output from the lighting device may be defined by the secondary light produced by the wavelength converter, either alone or in combination with unconverted primary light.

Photoluminescence generally involves absorbing primary light with a wavelength conversion material, such as a phosphor or mixture of phosphors. Absorption of the primary light can excite the wavelength conversion material to a higher energy state. When the wavelength conversion material returns to a lower energy state, it emits secondary light, generally of a different wavelength/wavelength range than the primary light. The wavelength/wavelength range of the secondary light can depend on the type of wavelength conversion material used. As such, secondary light of a desired wavelength/wavelength range may be attained by proper selection of wavelength conversion material. For higher energy primary light, this process may be understood as "energy down conversion" while similarly, an "energy up-conversion" process is known where multiple photons of lower energy primary light are converted to one photon of secondary light.

An LED combined with a wavelength-conversion structure that includes wavelength-conversion material, such as phosphor, to produce secondary light, may be described as a "phosphor-converted" or "wavelength-converted" LED.

A wide variety of wavelength converted lighting devices have been developed and commercialized for use in various applications. Such lighting devices can offer various benefits to end users, such as high light output, long life, and the like. For example, some wavelength converted LED lighting devices are rated for many years of service. However, with such benefits come various challenges, some of which are attributable to the wavelength converters and/or wavelength conversion materials used in such devices.

For example, various oxide and non-oxide ceramics have been identified as useful wavelength conversion materials. LuAG:Ce (i.e., lutetium aluminum garnet doped with cerium) is one example of an oxide ceramic material that can convert all or a portion of blue (primary) light incident thereon to broadband green (secondary) light. LuAG:Ce may be useful for various wavelength conversion applications because of the relatively high brightness of its secondary light emission, particularly within a wavelength range of 500 to 600 nanometers (nm). However, LuAG:Ce and other oxide and some non-oxide wavelength converters can exhibit undesirable amounts of thermal quenching at high power flux and/or elevated temperatures. The green secondary light emission of LuAG:Ce also has a relatively broad spectral full width half maximum (FWHM). As a result, some oxide and non-oxide materials (and in particular LuAG:Ce) may not be suitable for some applications.

Oxynitride phosphors doped with various activators have also been identified as being useful wavelength conversion materials. For example, some SiAlONs (i.e., silicon aluminum oxynitrides) doped with various activators are useful wavelength conversion materials that exhibit lower thermal quenching at high power and/or high temperature conditions, relative to certain other wavelength conversion materials, and in particular LuAG:Ce. In that regard, U.S. Pre-Grant Publication No 2017/0018689 (hereinafter, "the '689 publication"—by one of the inventors of this application) demonstrates that mixtures of α-M-SiAlON and β-M-SiAlON (where M is a metal such as Li, Ca, and Y) doped with europium ("Eu") and an amber phosphor are useful for forming wavelength converters with desirable properties, including excellent thermal quenching behavior and the production of white secondary light. While mixtures of α- and β-SiAlON such as those described in the '689 publication are useful, the inventors have identified that wavelength converters that include only β-SiAlON as a wavelength conversion material may also be of interest for some applications.

BRIEF DESCRIPTION OF THE DRAWINGS

Reference is now made to the following detailed description which should be read in conjunction with the following figures, wherein like numerals represent like parts.

DETAILED DESCRIPTION

One or more elements of the present disclosure may be numerically designated, e.g., as a first, second, third, etc. element. In this context it should be understood that the numerical designation is for the sake of clarity only (e.g., to distinguish one element from another), and that elements so designated are not limited by their specific numerical designation.

As used herein singular expressions such as "a," "an," and "the" are not limited to their singular form, and are intended to cover the plural forms as well unless the context clearly indicates otherwise. Specific terms/phrases excepted from this understanding include "single layer," and "single layer wavelength converter," which are used herein to designate a single (i.e., one) layer and a wavelength converter that is made up of a single (i.e. one) layer.

As used herein, the terms "substantially" and "about" when used in connection with an amount or range mean plus or minus 5% of the stated amount or the endpoints of the stated range.

As used herein, the term "optically transparent" when used in connection with a material means that the referenced material transmits greater than or equal to about 80% of incident light, such as greater than or equal to about 90%, greater than or equal to about 95%, greater than or equal to about 99%, or even about 100% of incident light. The incident light may be primary and/or secondary light of a specified wavelength or wavelength range (e.g., ultraviolet, visible, infrared, etc.), and/or may span multiple wavelength ranges. Without limitation, optically transparent materials described herein preferably transmit greater than or equal to about 95% (e.g., greater than or equal to about 99% or even about 100%) of primary and/or secondary light in at least one of the ultraviolet, visible, and infrared regions of the electromagnetic spectrum.

The terms, "light emitting diode," "LED," and "LED light source" are used interchangeably herein, and refer to any light emitting diode or other type of carrier injection/junction-based system that is capable of generating radiation in response to an electrical signal. Thus, the term LED includes but is not limited to various semiconductor-based structures that emit light in response to current, light emitting polymers, light emitting strips, electro-luminescent strips, combination thereof and the like. In particular, the term LED refers to light emitting diodes of all types (including semiconductor and organic light emitting diodes) that may be configured to generate light in all or various portions of one or more of the visible, ultraviolet, and infrared spectrum. Non-limiting examples of suitable LEDs that may be used include various types of infrared LEDs, ultraviolet LEDs, red LEDs, green LEDs, blue LEDs, yellow LEDs, amber LEDs, orange LEDs, and white LEDs. Such LEDs may be configured to emit light over a broad spectrum (e.g., the entire visible light spectrum) or a narrow spectrum.

As used herein, the term "on" may be used to describe the relative position of one component (e.g., a first layer) relative to another component (e.g., a second layer). In such instances the term "on" means that a first component is present above a second component, but is not necessarily in contact with one or more surfaces of the second component. That is, when a first component is "on" a second component, one or more intervening components may be present between the first and second components. In contrast, the term "directly on" means that a first component is in contact with a surface (e.g., an upper surface) of a second component. Therefore when a first component is "directly on" a second component, it should be understood that the first component is in contact with the second component, and that no intervening components are present between the first and second components.

The terms "ceramic wavelength converter" and "wavelength converter" are interchangeably used herein to refer to a solid single phase or monolithic piece or a ceramic matrix based composite (e.g., with single or multiple layer thin film coatings on one side or both sides of a substrate) that includes at least one sintered wavelength conversion material, such as an inorganic phosphor, that converts at least a portion of the light from an excitation source (i.e., primary light) to a light of a different wavelength (i.e., secondary light).

As used herein the term "D50" when used in connection with particle size means the average particle diameter by volume distribution of particles.

The phrases "high density" and "highly dense" are used herein with reference to a wavelength converter to mean that wavelength converter has a density that is at least about 90% of the theoretical bulk density of the materials that are included in the wavelength converter. In embodiments, wavelength converters described consistent with the present disclosure have a density that is at least about 95% or even about 99% of the theoretical bulk density of the material(s) that are included in the wavelength converter.

Ranges are used herein to describe various features of elements of the present disclosure. Such ranges are enumerated herein for the sake of example only, unless expressly indicated otherwise. The ranges herein should also be understood to include all of the individual values of falling within the indicated range as though such values were expressly recited, and to encompass sub ranges within the indicated range as though such sub ranges were expressly recited. By way of example, a range of 1 to 10 should be understood to include the individual values of 2, 3, 4 . . . etc., as well as the sub ranges of 2 to 10, 3 to 10, 2 to 8, etc., as though such values and sub ranges were expressly recited.

As noted in the background the inventors have identified that wavelength converters that include only β-SiAlON as a wavelength conversion material may be useful for certain applications. In that regard the term "β-SiAlON" is used herein to refer to a phosphor or luminescent material that consists of the elements Si, Al, O, and N, and optionally one or more activator elements. This is in part because loose particles of β-SiAlON doped with one or more activators such as Eu (europium) exhibit a narrow band emission (full width half maximum (FWHM) of about 54 nanometers (nm)) of secondary light within the green region of the electromagnetic spectrum (i.e., from about 495 to about 600 nm). The properties of the material, however, make it challenging to form highly dense wavelength converters that include only β-SiAlON as a wavelength conversion material while retaining a desirably narrow secondary light emission within the green region of the electromagnetic spectrum.

More specifically, commercially available β-SiAlON is often in the form of highly crystalline particles that: have a relatively large particle size (D50 of about 20 to 50 microns (μm)); include relatively low levels of dopants (e.g., Europium) for increased quantum efficiency (QE); and have a low bulk diffusion coefficient. Those characteristics make it difficult to consolidate (e.g., by sintering or another process) particles of β-SiAlON into a high density wavelength converter that retains the desirable secondary light emission properties of loose β-SiAlON particles.

Some previously known processes for producing loose β-SiAlON phosphor particles doped with Eu use synthesis conditions that include very high temperature (e.g. greater than or equal to 1900° C.), long dwell time (e.g. about 2 to about 12 hours) and elevated atmospheric (e.g. $N_2$ gas) pressure (e.g., about 1 to about 100 atmospheres). The result of such processes is the production of relatively large β-SiAlON particles (D50>20 μm) with the above noted properties. To consolidate such particles (e.g., via sintering), it may be necessary to heat the particles for long periods of time (e.g. greater than or equal to about 2 to about 12 hours) under even higher atmospheric pressure (e.g., 99.999% purity $N_2$ at greater than or equal to about 1.0 to about 100 megapascals (MPa)), optionally with the application of high mechanical pressure (e.g., mechanical pressure of about 1 to about 200 MPa), and at high peak temperatures (e.g., greater than or equal to about 1900 degrees Celsius). While such sintering processes can produce a β-SiAlON wavelength converter that is relatively dense, such wavelength converters may produce a secondary light in the green region of the electromagnetic spectrum that is either broader than the secondary light emission exhibited by loose (unsintered) β-SiAlON particles that were used to produce the wavelength converter, or of lower quantum efficiency (QE) (e.g., from undesirable contaminations and/or diffusion caused by the sintering conditions used to consolidate the loose particles).

For example, loose β-SiAlON particles may exhibit a secondary light emission with a peak in the green region having a FWHM of less than or equal to 55 nm and quantum efficiency (QE) of around 80% (depending on material preparation and measurement methods). In contrast, a wavelength converter produced by sintering those loose particles of β-SiAlON using previously known methods may exhibit a secondary light emission with a peak in the green region having a FWHM of greater than 65 nm. Alternatively or additionally, the wavelength converters produced by the previously known methods may exhibit QE that is relatively low (e.g. 30%), as compared to the QE of the loose particles. Without wishing to be bound by theory, it is believed that the high temperature, high pressure, and long dwell times employed by previously known processes cause modifications in the β-SiAlON unit cell and/or reactions between components of β-SiAlON and components (e.g., oxygen, nitrogen, and other undesirable metal elements or metal containing species etc.) in the atmosphere, ultimately leading to a lower quantum efficiency (QE), broadening of the secondary light emission, and/or a blue- or red-shift in the secondary light emission spectra, relative to the secondary light emission of the loose particles.

With the foregoing in mind, the present disclosure relates to highly dense wavelength converters that include β-SiAlON as a wavelength conversion material and one or more sintering aids, as well as methods of forming the same. As will be described in detail, the methods described herein can enable the production of wavelength converters that comprise, consist essentially of, or consist of β-SiAlON and one or more sintering aids, wherein the wavelength converter is highly dense and exhibits a secondary light emission with a narrow (FWHM less than about 65 nm) peak in the green region (about 495-600 nm) of the electromagnetic spectrum.

As will be described further herein, the inventors have unexpectedly found that proper selection and incorporation of one or more sintering aids which are both physically and chemically compatible with β-SiAlON can enable the production of highly dense wavelength converters at peak sintering temperatures that are relatively low (e.g., from about 1500-1750 degrees Celsius), compared to the peak temperatures used in previously known β-SiAlON sintering processes (e.g., about 1900 degrees Celsius or more). The methods described herein can also produce wavelength converters that are highly dense and which retain a desired narrow band secondary light emission (FWHM greater than 0 to less than about 65 nm, such as greater than 0 to less than about 60 nm, or even greater than 0 to less than or equal to about 54 nm). Moreover, the methods described herein may be relatively simple and inexpensive compared to other processes for producing wavelength converters including β-SiAlON, and therefore may be good candidates for scale up and commercial production.

As used herein the term "sintering aid" is used to refer to a material that is used to facilitate sintering of β-SiAlON particles into ceramic wavelength converter. The amount of sintering aid (relative to β-SiAlON) may vary considerably, e.g., from about 5 to about 95% by volume. In some embodiments a relatively large (e.g. >50% by volume) amount of sintering aid is used. In such instances the sintering aid may be understood to serve as and/or form a "matrix" for β-SiAlON, e.g., such that a wavelength converter includes a β-SiAlON phase dispersed within a sintering aid phase. Alternatively in some embodiments a relatively small (≤50% by volume) amount of sintering aid is used. In such instances the sintering aid may be present in the wavelength converter as a sintering aid phase that is dispersed in a β-SiAlON phase. It should therefore be understood that the term "sintering aid" is used herein for the sake of reference only, and is not necessarily indicative of a specific function or quantity of the sintering aid material within the wavelength converters described herein.

Figure 1:
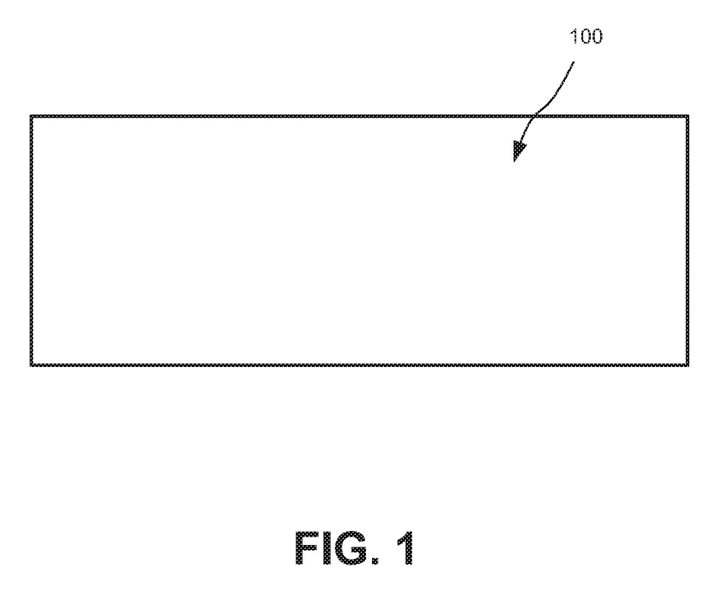
FIG. 1 depicts a generalized structure of one example of a wavelength converter that includes β-SiAlON and one or more sintering aids, in accordance with embodiments of the present disclosure.

FIG. 1 depicts a generalized structure of one example of a wavelength converter 100 consistent with the present disclosure, and which comprises, consists essentially of, or consists of β-SiAlON and one or more sintering aid(s). Without limitation, in embodiments the wavelength converter 100 consists essentially of β-SiAlON and one or more sintering aids, and is highly dense (i.e., has a density that is greater than 90% of the theoretical bulk density of the β-SiAlON and sintering aid(s)). Theoretical bulk density of the wavelength converter 100 is calculated using the mixture rule, whereby the theoretical bulk density is based on the density and volume percent of each of the comprising materials, e.g., β-SiAlON and one or more sintering aids, for the wavelength converter 100. For example, assuming the volume percent of β-SiAlON is $V_\beta$, the density of β-SiAlON is $D_\beta$, the volume percent of sintering aids A, B, C . . . and so on are $V_A$, $V_B$, $V_C$ . . . and so on, and the density of the sintering aids are $D_A$, $D_B$, $D_C$ . . . and so on, respectively, the theoretical bulk density of a wavelength converter ($D_{convert}$) may be calculated using the equation: $D_{convert.} = V_\beta D_\beta + V_A D_A + V_B D_B + V_C D_C + \ldots$ . The wavelength converter 100 is also capable of producing a secondary light emission that has a peak in the 495 to 600 nm region of the electromagnetic spectrum, wherein that peak has a full width half maximum (FWHM) of less than 65 nm, such as less than about 60 nm, or even less than about 55 nm. The wavelength converters described herein may also exhibit relatively high quantum efficiency (QE), e.g., QE greater than or equal to about 60%, about 70%, about 80%, or even about 90% or more.

The wavelength converter 100 is also accurately referred to as an inorganic ceramic wavelength converter. As used herein, an inorganic wavelength converter is a wavelength converter that does not include organic materials. Rather, an inorganic ceramic wavelength converter is a wavelength converter that consists of inorganic materials, such as β-SiAlON and one or more inorganic sintering aids.

Returning to FIG. 1, in embodiments the wavelength converter 100 is a consolidated (e.g., sintered or otherwise thermally processed) article formed from a wavelength converter precursor. Prior to consolidation, the wavelength converter precursor includes first particles and second particles, wherein the first particles are particles of a wavelength conversion material and comprise, consist essentially of, or consist of β-SiAlON particles. The second particles are particles of one or more sintering aids. The wavelength converter precursor may be provided in any suitable manner, such as by mixing, blending, or otherwise dispersing the first and second particles with one another. Alternatively, the wavelength converter precursor may be in the form of alternative layers of first and second particles (e.g., a layer of first particles, a layer of second particles, a layer of first particles, etc.). In any case the wavelength converter precursor may be subject to thermal processing (e.g., sintering or another consolidation process) to form a wavelength converter consistent with the present disclosure.

A wide variety of sintering aids may be used in the wavelength converters and converter precursors described herein. Without limitation, in embodiments the wavelength converter or a precursor thereof includes one or more sintering aid(s) that is/are compatible with β-SiAlON. As used herein, the term "compatible" when used in connection with a sintering aid means that the referenced sintering aid is both physically and chemically compatible with β-SiAlON, and which does not or does not substantially affect the luminescent properties of β-SiAlON. A sintering aid is physically compatible with a β-SiAlON if it has physical properties (e.g., coefficient of thermal expansion and Young's modulus) that are close (e.g., within 10%) of the corresponding properties of β-SiAlON, after thermal processing (e.g., sintering) of the precursor to form a wavelength converter. In contrast, a sintering aid is chemically compatible with β-SiAlON if it does not (or its constituent elements do not) react with β-SiAlON under the conditions (temperature, pressure, etc.) applied during thermal processing of the precursor. Chemical incompatibility and/or compatibility may be determined, for example, by examining the effect of a sintering aid on the luminescent properties of β-SiAlON. In some embodiments one or more compatible and optically transparent sintering aid is used. Without limitation, in embodiments the sintering aid(s) included in the wavelength converters described herein consist essentially of or consist of one or more compatible and optically transparent sintering aid.

Non-limiting examples of suitable sintering aids that may be used include those of the formula $M_xN_y$, where M is a metal selected from Lithium (Li), Sodium (Na), Potassium (K), Beryllium (Be), Magnesium (Mg), Calcium (Ca), Strontium (Sr), Barium (Ba), Boron (B), Aluminum (Al), Gallium (Ga), Yttrium (Y), or the like, N is selected from Fluorine (F), Chlorine (Cl), Oxygen (O), Nitrogen (N), combinations thereof or the like, x is an integer, and y is an integer. Specific examples of such sintering aids include yttrium (III) oxide ($Y_2O_3$), aluminum oxide ($Al_2O_3$), magnesium oxide (MgO), silicon dioxide ($SiO_2$), europium (III) oxide ($Eu_2O_3$), silicon nitride ($Si_3N_4$), aluminum nitride (AlN), combinations thereof, and the like. Other non-limiting examples of suitable sintering aids include yttrium or other aluminum garnets (e.g. YAG, LuAG without activator ions, etc.), spinel ($MgAl_2O_4$), and oxynitrides such as aluminum oxynitrides (AlON). Without limitation, in some embodiments the wavelength converters and wavelength converter precursors described herein include at least one sintering aid that includes, consists essentially of, or consists of YAG, spinel, one or more aluminum oxynitrides or a combination thereof.

One or more than one type of sintering aid may be used in the wavelength converters and wavelength converter precursors described herein. In some embodiments the wavelength converters and precursors described herein include a single type of sintering aid selected from the example sintering aids noted above, e.g. YAG, spinel, etc. Alternatively, in some embodiments two or more sintering aids are used, in which case the sintering aids may be selected from the example wavelength converters described above. For example, in embodiments first and second sintering aids are used, wherein the first sintering aid is YAG and the second sintering aid is spinel. That combination is of course for the sake of example only, and any suitable combination of sintering aids may be used.

The converter precursor may also include one or more precursors of one or more sintering aids. For example, when the sintering aid is YAG and/or spinel, a converter precursor may include compounds (sintering aid precursors) that react to form YAG and/or spinel under the conditions applied during thermal processing of the precursor. Non-limiting examples of sintering aid precursors include oxides and nitrides, such as but not limited to $Y_2O_3$, $Al_2O_3$, MgO, AlN and combinations thereof and the like. Alternatively, in some embodiments a pre-formed sintering aid may be included in a wavelength converter precursor. For example, in some instances particles of YAG, spinel ($MgAL_2O_4$) and/or other suitable pre-formed sintering aids may be included in a wavelength converter precursor.

Any suitable β-SiAlON may be used in the wavelength converters and converter precursors described herein. Non-limiting examples of suitable β-SiAlONs that may be used include those of the formula β $M-Si_{6-z}Al_zO_zN_{8-z}$, where M is omitted or is selected from lithium (Li), calcium (Ca), yttrium (Y), or the like, and z represents the number of Al—O bonds substituting for Si—N bonds and ranges from greater than 0 to less than or equal to 4.2. Such β-SiAlONs may be doped with one or more activators, or they may be undoped. When they are doped, the amount of activator in the β-SiAlONs described herein may range from about greater than 0 to about 15 atomic %, such as from about 0.1 to about 12 atomic %. Examples of suitable activators that may be used include elements in the lanthanide series (e.g., cerium (Ce), praseodymium (Pr), neodymium (Nd), promethium (Pm), samarium (Sm), europium (Eu), gadolinium (Gd) terbium (Tb), dysprosium (Dy), holmium (Ho), erbium (Er), Thulium™, ytterbium (Yb)) or transition metal ions such as $Mn^{2+}$ combinations thereof, and the like. In one example embodiment, the wavelength converter includes Eu doped β-SiAlON, such as but not limited to an Eu doped β-SiAlON of the formula $Eu_{0.00296}Si_{0.41395}Al_{0.01334}O_{0.0044}N_{0.56528}$.

The relative amount of β-SiAlON and sintering aid(s) in the wavelength converters and converter precursors described herein can vary widely depending on the application and desired properties. For example, the amount of β-SiAlON may impact the amount of primary light that is converted to secondary light by the wavelength converter. Moreover, the amount of β-SiAlON can impact the thermal processing conditions used to convert a wavelength converter precursor to a wavelength converter. Still further, the amount of β-SIAlON (relative to the amount of sintering aid) can affect the density of the resulting wavelength converter. For example, as the amount of β-SiAlON in the converter increases (relative to the sintering aid), the achievable density of the wavelength converter decreases. Conversely, as the amount of β-SiAlON decreases (relative to the sintering aid), the achievable density increases. It may therefore be desirable to select the relative amount of the β-SiAlON and sintering aid(s) in the wavelength converters and converter precursors described herein to achieve desired characteristics. With that in mind, the wavelength converters described herein may include an amount (X) of β-SiAlON and an amount (Y) of sintering aid, wherein X and Y are in volume percent and the sum of X and Y is equal to the total volume of the wavelength converter, i.e., 100%. In some embodiments, X ranges from about 5 to about 95 volume %, and Y ranges from about 95 to about 5 volume %, respectively. Without limitation, in some embodiments the wavelength converters described herein include about 32.5 to about 75 volume % of β-SiAlON and about 25 to about 67.5 volume % of one or more sintering aids (e.g., YAG, Spinel, combinations thereof, and the like). In embodiments, the inventors observed that converter precursors containing about 75 volume % β-SiAlON and about 25 volume % sintering aid (e.g., YAG) could be consolidated into wavelength converters having a density>90% (e.g., about 94%) of the theoretical bulk density of the materials in the converter precursor. In other embodiments, the inventors observed that converter precursors containing about 33 volume % of β-SiAlON and about 67 volume % of sintering aid (e.g. YAG) could be consolidated into wavelength converters having a density>95% (e.g., about 98% or even about 99%) of the theoretical bulk density of the materials in the converter precursor.

Put differently, in some embodiments the wavelength converters described herein include β-SiAlON in an amount ranging from greater than 0 to about 95% by weight, such as from greater than 0 to about 80% by weight, or even from greater than or equal to about 50 weight % to 80% by weight, relative to the total weight of the wavelength converter. In such embodiments, the wavelength converters include one or more sintering aids in an amount ranging from about 5 weight % to less than about 100 weight %, such as from about 50 to less than about 100 weight %, or even from about 20 to less than about 100 weight %. Without limitation, in some embodiments the β-SiAlON material is present in an amount ranging from about 25 to about 68 weight %; and the sintering aid(s) is/are present in an amount ranging from about 32 to about 75% by weight, relative to the total weight of the wavelength converter 100.

Another aspect of the present disclosure relates to methods for producing a wavelength converter that includes, consists essentially of, or consists of β-SiAlON and one or more sintering aids. As mentioned above and will be described further below, the wavelength converters described herein are generally formed by subjecting a wavelength converter precursor that includes particles of β-SiAlON and particles of or one or more sintering aids to a thermal treatment process (e.g., sintering), so as to form a consolidated, monolithic article. The consolidated article may be in the form of a highly dense wavelength converter that exhibits narrow band emission of secondary light in the green region of the electromagnetic spectrum.

Figure 2:
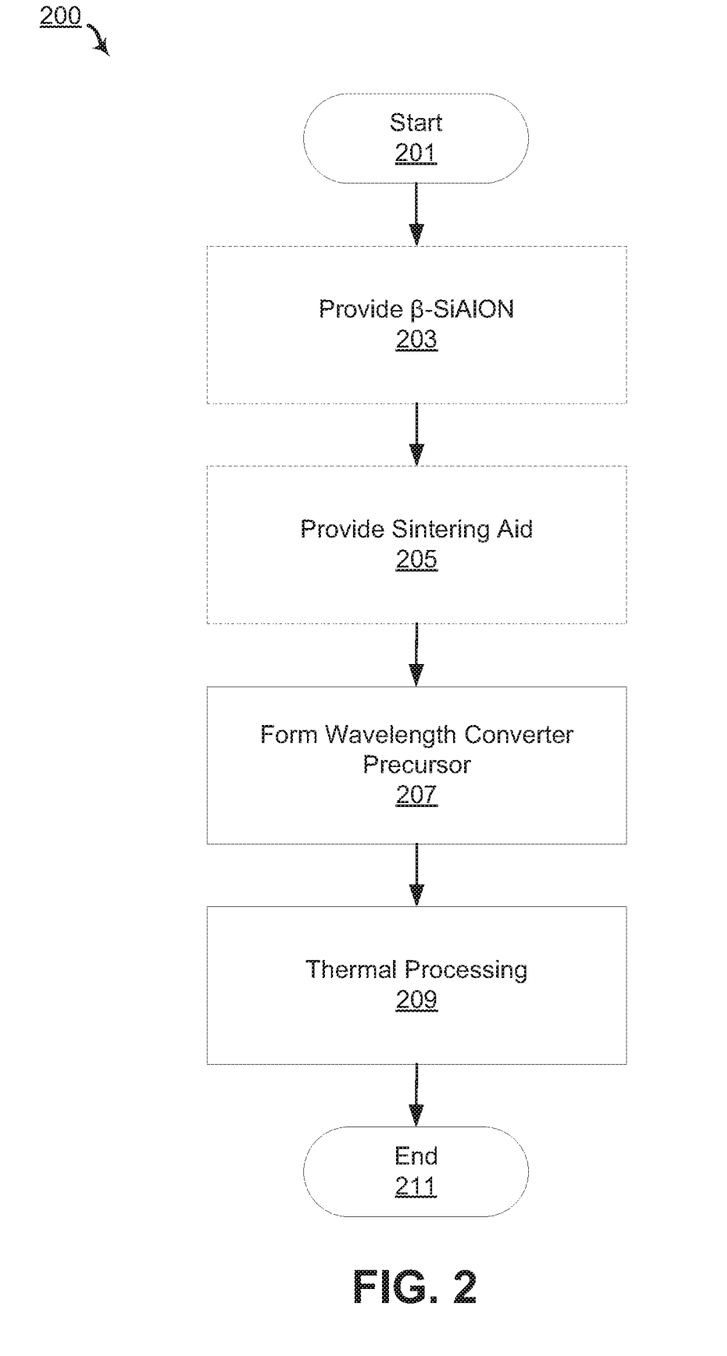
FIG. 2 is a flow chart of example operations of one example method of forming a wavelength converter consistent with the present disclosure.

Reference is therefore made to FIG. 2 which is a flow chart of operations of one example of a method of forming a wavelength converter consistent with the present disclosure. As shown, method 200 begins at block 201. Method 200 may then proceed to optional block 203 pursuant to which particles of one or more β-SiAlONs are provided. Operations pursuant to optional block 203 may include, for example, producing particles of β-SiAlON, e.g., via ball milling, attritor milling, or another suitable process. Alternatively, the operations of block 203 may be omitted, e.g., where particles of β-SiAlON are obtained in some other manner, such as by direct solid state reaction process or purchase from a commercial vendor.

Once particles of β-SiAlON are provided pursuant to optional block 203 (or if block 203 is omitted), method 200 may proceed to optional block 205, pursuant to which particles of one or more sintering aids and/or a precursor thereof are provided. Operations pursuant to optional block 205 may include, for example, producing particles of sintering aid and/or sintering aid precursor, e.g., by ball milling, attritor milling, or another suitable process. Alternatively, the operations of block 205 may be omitted, e.g., where particles or one or more sintering aids and/or a precursor thereof are obtained in some other manner, such as from a commercial vendor.

The particle size of the particles of β-SiAlON and particles of one or more sintering aids/sintering aid precursors may have an impact on the processing of such materials into a consolidated (e.g., sintered) article and, in some cases, on the optical performance of the consolidated article as a wavelength converter. It may therefore be desirable to select and/or control the size of the particles of β-SiAlON and the particles of sintering aid/precursor to a desired D50 particle size. In some embodiments, the particles of β-SiAlON and the particles of sintering aid/precursor each have a D50 particle size ranging from about 0.1 microns to about 50 microns, such as from about 0.1 microns to about 15 microns, or even about 1 micron to about 10 microns. Without limitation, in some embodiments the particles of β-SiAlON have a D50 particle size ranging from about 0.2 to 5 microns, and the particles of sintering aid are particles of YAG or spinel ($MgAl_2O_4$) with an average (D50) particle size of 0.2 to 5 microns.

The aspect ratio (length:width) of the particles of β-SiAlON and the particles of sintering aid/precursor may also have an impact on the processing of such materials into a consolidated (e.g., sintered) article and, in some cases, on the optical performance of the consolidated article as a wavelength converter. It may therefore be desirable to control and/or select the aspect ratio of the particles of β-SiAlON and/or the particles of the one or more sintering aids/precursors such that they have a desired shape. In some embodiments, the particles of β-SiAlON and the particles of sintering aid each have an aspect ratio ranging from about 1:1 (i.e., substantially spherical) to about 50:1, such as from about 1:1 to about 25:1, or even about 1:1 to about 10:1. Without limitation, in some embodiments the particles of β-SiAlON and the particles of sintering aid/precursor each have an aspect ratio ranging from about 1:1 to about 5:1.

Following the operations of block 205 (or if such operations are omitted) the method 200 may proceed to block 207, pursuant to which a wavelength converter precursor may be provided. In general, the wavelength converter precursor comprises, consists essentially of, or consists of a mixture or blend of first particles and second particles, wherein the first particles comprise, consist essentially of, or consist of particles of β-SiAlON, and the second particles comprise, consist essentially of, or consist of particles of one or more sintering aids (or one or more precursors thereof). Without limitation, in some embodiments the wavelength converter precursor is a blend consisting essentially of or consisting of particles of β-SiAlON and particles of one or more sintering aids that are compatible with the β-SiAlON.

Accordingly, operations pursuant to block 207 may include mixing, blending, layering, or otherwise distributing/dispersing appropriate amounts of particles of β-SiAlON and particles of at least one sintering aid. In embodiments, the result of such operations may be a wavelength converter precursor containing a homogeneous mixture of particles of β-SiAlON and particles of at least one sintering aid, where the relative amounts of such particles in the converter precursor are within the above noted volume and/or weight percentage ranges noted above with regard to the wavelength converters described herein.

Following the provision of a wavelength converter precursor the method 200 may advance to block 209, pursuant to which thermal processing may be carried out to convert the wavelength converter precursor into a wavelength converter consistent with the present disclosure. In general, the thermal processing involves subjecting the wavelength converter precursor to heat (either alone or in combination with elevated pressure) to form a sintered article that has a density greater than 90% of the theoretical bulk density of the β-SiAlON and one or more sintering aids, as well as a secondary light emission including a peak in the wavelength range of about 495 to 600 nm having a FWHM of greater than 0 to less than about 65 nm.

A wide variety of thermal treatment processes may be used to carry out the thermal processing operations of block 209. By way of example, the thermal processing carried out pursuant to block 209 may be or include sintering the wavelength converter precursor to form a wavelength converter. In that regard any suitable sintering process may be used, such as but not limited to spark plasma sintering (SPS), pressureless sintering, hot pressing, hot isostatic pressing, microwave sintering, combinations thereof, and the like. Of those sintering processes, SPS and pressureless sintering may be preferred sintering processes because of the reproducibility of their results and the relative ease with which they may be implemented in commercial manufacturing. Thus for the sake of illustration and ease of understanding the present disclosure will focus on embodiments in which a wavelength converter precursor is sintered via an SPS or pressureless (PLS) sintering process.

With the foregoing in mind, in some embodiments the operations of block 209 are or include sintering a wavelength converter precursor via SPS. In embodiments, the SPS process includes placing a wavelength converter precursor in the form of a powder, a powder compact, or a disk into a conductive die (e.g., a graphite or other suitable conductive die). Subsequently, the wavelength converter precursor may be mechanically compressed and heated while a pulsed direct current is passed through the die. Heating of the wavelength converter precursor may be performed in accordance with a predetermined heating profile, which may include one or more peak temperatures, predetermined dwell/hold periods for the peak temperatures, quench (cooling) periods, and quench (cooling) rates at which quenching occurs. In some embodiments, the wavelength converter precursor is subject to an SPS process in which it is heated to a peak temperature ranging from about 1450 to about 1700 degree Celsius (e.g., about 1500 to about 1670 degrees Celsius) for greater than 0 to about 60 minutes, such as about 2 to about 30 minutes. Such heating may be performed in an atmosphere of nitrogen gas, one or more inert gases, or a forming gas such as an atmosphere of about 2 volume % hydrogen and about 98 volume % nitrogen.

During the SPS process the wavelength converter precursor may be subject to mechanical pressure as it is being heated. In some embodiments, for example, the wavelength converter precursor is mechanically compressed to a pressure ranging from about 5 to about 75 megapascals (MPa), such as from about 5 to about 50 MPa, or even about 25 MPa to about 50 MPa as it is heated. Without limitation, in some embodiments the wavelength converter precursor is mechanically compressed to a pressure of about 50 MPa as it is heated to a temperature ranging from about 1500 to about 1670 degrees Celsius for about 2 to 30 minutes while a direct current is pulsed through the conductive die. In any case, in embodiments the result of the SPS process is the formation of a highly dense sintered article, i.e., a highly dense wavelength converter that includes, consists essentially of, or consists of β-SiAlON and one or more sintering aids, and which exhibits narrow band secondary light emission in the green region of the electromagnetic spectrum.

In other embodiments the thermal processing operations of block 209 are or include pressureless sintering (PLS). Such a PLS process may include disposing a wavelength converter precursor in the form of a powder, a powder compact, or a disk into a crucible with or without a powder bed. The crucible may then be placed in a furnace or other suitable heating device. The wavelength converter precursor may then be heated to a peak temperature, e.g., in a vacuum, in an inert gas atmosphere, or in an atmosphere containing a forming gas (e.g., 2 volume % hydrogen, 98 volume % nitrogen.

Heating in a PLS process may be carried out in accordance with a heating profile that includes a peak temperature, one or more predetermined dwell/hold periods for the peak and/or one or more or sub-peak temperatures, one or more quench periods, and the like. The peak temperature may range from about 1500 to 1800 degrees Celsius, such as from about 1580 to about 1750 degrees Celsius.

In some embodiments the thermal processing operations of block 209 include subjecting a wavelength converter precursor to a PLS process, wherein the PLS process includes placing the wavelength converter precursor in the form of a powder compact into a crucible. The crucible may be formed from, for example, BN, Al2O3, W, W/MO alloy, or other suitable material capable of withstanding sintering conditions. A powder bed containing $Y_2O_3$, $Al_2O_3$, $CeO_2$, BN, AlN, YAG, or any mixture thereof may optionally be present in the crucible prior to placement of the wavelength converter precursor therein. Other powder bed materials are within the scope of this disclosure and the provided examples are not intended to be limiting.

The crucible containing the precursor may then be placed into a heating chamber, e.g., of a furnace. A vacuum may be drawn or a forming gas may be introduced, after which the wavelength converter precursor may be heated in accordance with a heating profile. The heating profile may specify, for instance, heating the wavelength converter to one or more temperatures and holding the precursor at those respective temperatures for various period of time.

For example, in some embodiments the heating profile may specify heating the wavelength converter precursor from room temperature, e.g., about 25 degrees Celsius, to a first temperature. The first temperature may be greater than 0 to about 500 degrees Celsius, such as greater than or equal to about 100 to about 400 degrees Celsius, greater than or equal to about 200 to about 400 degrees Celsius, etc. The wavelength converter precursor may be held at the first temperature for a first time period. The first time period may range from greater than 0 to about 30 minutes, greater than 0 to about 25 minutes, or even greater than 0 to about 20 minutes. In embodiments, the first temperature is about 200 degrees Celsius, and the first time period is about 20 minutes.

Then, in accordance with the heating profile, the temperature may be increased from the first temperature to a second temperature, and may be held there for a second time period. The second temperature may range from greater than or equal to 500 to about 1200 degrees Celsius, such as greater than or equal to about 600 to about 1150 degrees Celsius, or even greater than or equal to about 700 to about 1100 degrees Celsius. The second time period may range from greater than 0 to about 20 minutes, such as greater than 0 to about 15 minutes, or even from about 1 to about 10 minutes.

Without limitation, in some embodiments the second temperature is about 1000 degrees Celsius and the second time period is about 10 minutes.

Further in accordance with the heating profile, the temperature may be increased from the second temperature to a third temperature, and may be held there for a third time period. The third temperature may range from about 1200 to about 1500 degrees Celsius, such as from about 1200 to about 1475 degrees Celsius, or even about 1200 to about 1450 degrees Celsius. The third time period may range from greater than 0 to about 20 minutes, such as from greater than 0 to about 15 minutes, or even from about 5 to about 10 minutes. Without limitation, in embodiments the third temperature is about 1450 degrees Celsius and the third time period is about 10 minutes.

Finally, the temperature may be increased from the third temperature to a fourth (peak) temperature, for a fourth time period. In general, the fourth (peak) temperature and fourth time period are sufficient to produce a highly-dense, sintered article. In embodiments the fourth temperature ranges from greater than or equal to about 1500 to about 1800 degrees Celsius, such as from about 1500 to about 1750 degrees Celsius, or even from about 1580 to about 1750 degrees Celsius. The fourth time period may range from greater than 0 to about 500 minutes, such as from greater than 0 to about 400 minutes, greater than or equal to about 10 to about 300 minutes, or even greater than or equal to about 60 to about 300 minutes. Without limitation, in embodiments the fourth temperature is about 1580 to 1750 degrees Celsius, and the fourth time period ranges from about 10 to about 300 minutes, resulting in the formation of a sintered article.

Following processing at the peak temperature, the resulting sintered article may be cooled down (quenched). The manner and rate at which quenching is performed is not particularly limited, and any suitable quenching process may be used. In embodiments, the sintered article is quenched at a first quench rate to a first quenching temperature, after which is quenched at a second rate to second quench temperature. The first quench temperature may range from about 500 to about 1200 degrees Celsius, such as about 600 to about 1000 degrees Celsius, or even about 600 to about 900 degrees Celsius, and the first quench rate may range from greater than 0 to about 50 Celsius per minute, such as from greater than 0 to about 30 Celsius per minute. The sintered article may be held at the first quenching for a first quench time, which may range from greater than 0 to about 15 minutes, such as greater than or to about 10 minutes.

The temperature may then be lowered from the first quench temperature to a second quench temperature, e.g., at a second quench rate. The second quench temperature may be at or near room temperature, and the second quench rate may be less than the first quench rate. In embodiments, the second quench rate ranges from greater than 0 to about 5 degrees Celsius per minute, such as from greater than 0 to about 3 degrees Celsius per minute. In some embodiments, the second quench rate is about 3 degrees Celsius per minute.

In any case the result of the operations of block 209 is a sintered article in the form of an inorganic wavelength converter that comprises, consists essentially of, or consists of β-SiAlON and one or more sintering aids, wherein the wavelength converter has a density≥90% of the theoretical bulk density of the combination of the β-SiAlON and sintering aid(s), and exhibits a secondary light emission having a peak with an FWHM that is less than or equal to about 65 nm (e.g., less than or equal to about 55 nm) within the wavelength range of about 495-600 nm.

Following the operations of block 209, the method 200 may proceed to block 211 and end.

Figure 3:
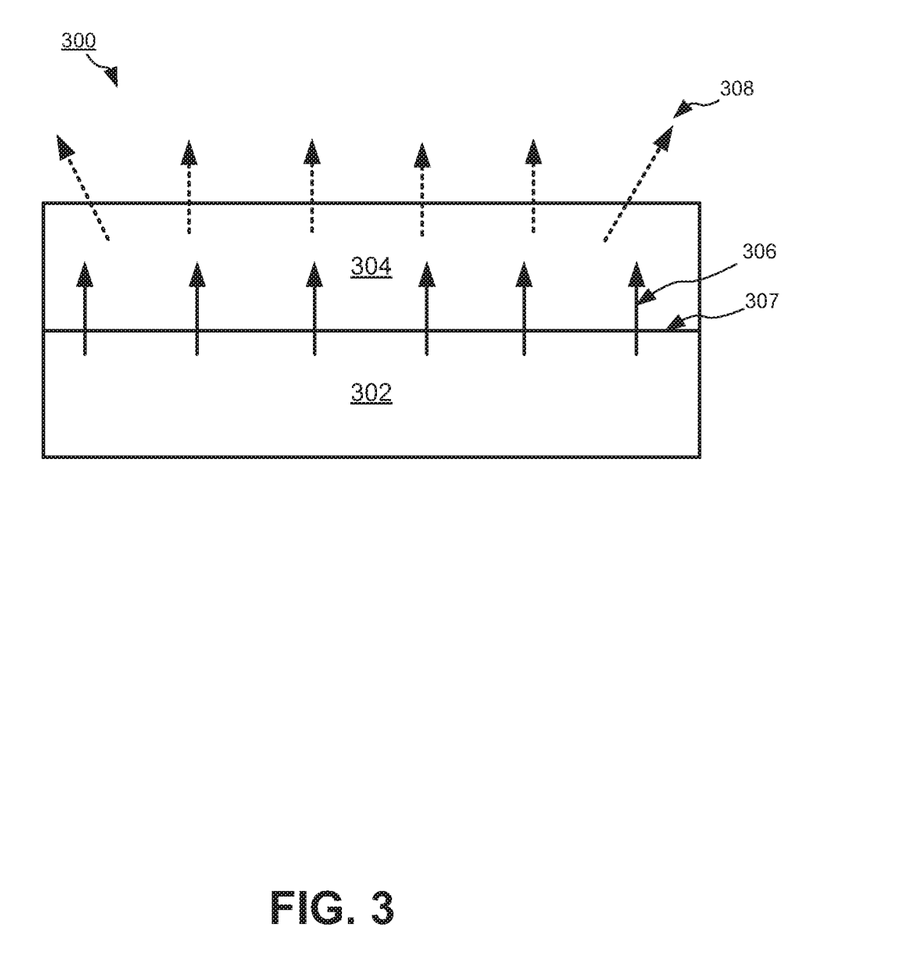
FIG. 3 illustrates one example of a lighting device consistent with the present disclosure.

FIG. 3 is a block diagram of one example of a lighting device 300 consistent with the present disclosure. The lighting device 300 includes a light source 302 and a wavelength converter 304. The wavelength converter 304 comprises, consists essentially of, or consists of β-SiAlON and one or more sintering aids, as described above. In some embodiments, the wavelength converter 304 is formed using a method consistent with the present disclosure, such as but not limited to method 200.

The light source 302 may be any light source capable of emitting primary light 306. Non-limiting examples of such light sources include solid state sources such as LEDs (e.g., nitride III-V LEDs such as an InGaN LED) and laser diodes. In operation, the light source 302 may emit primary light 306 from a light emitting surface 307 thereof. The primary light 306 may be described by a number of parameters such as peak or dominant wavelength, color coordinates, intensity, etc. In any case, wavelength converter 304 may convert at least a portion of the primary light 306 into a secondary light 308. The secondary light 308 may be characterized by a peak in the green region (495-600 nm) with a FWHM of greater than 0 to less than or equal to about 65 nm, such as greater than 0 to less than or equal to about 60 nm, or even greater than 0 to less than or equal to about 55 nm.

The wavelength converter 304 may convert all or a portion of incident the primary light 306 that is incident thereon to secondary light 308 (i.e., to exhibit a desired level of conversion efficiency). In embodiments, the primary light 306 is visible (e.g., blue) light, and the wavelength converter 304 exhibits a conversion greater than or equal to 50%, such as about 50 to about 100%, about 60 to about 99%, about 70 to about 98%, about 80 to about 97%, or even about 85 to about 96%. In embodiments, the conversion efficiency of the wavelength converter 304 is greater than 95%. For example, in some embodiments the light source 302 may emit blue primary light 306 having a wavelength of about 475 nm (blue light), and the secondary light 308 may exhibit a peak with a full width half maximum (FWHM) of greater than 0 to about 60 nanometers (nm) within a wavelength range of about 495 nm to about 600 nm.

EXAMPLES

Several wavelength converters consisting of β-SiAlON and one or more sintering aids were prepared and tested as described in examples 1 and 2 below.

Example 1

In this example a wavelength converter was prepared by sintering a wavelength converter precursor using a pressureless sintering (PLS) process. To produce the wavelength converter precursor a blend of 75% by volume of β-SiAlON particles as a wavelength conversion material and 25% by volume of yttrium aluminum garnet (YAG) as a sintering aid was formed. The β-SiAlON particles had an aspect ratio of ranging from about 1:1 to about 20:1 and a D50 particle size of about 0.5 to about 20 μm. The YAG particles had an aspect ratio of about 1:1 to about 5:1 and a D50 particle size of about 0.1 um to about 5 um. The blend was then subject to uniaxial pressing at about 10 to about 35 MPa followed by wet-bag isopressing at about 100-200 MPa. The resulting wavelength converter precursor was in the form of a disk having a diameter of about 25 millimeters (mm) and a thickness of about 2 mm.

The wavelength converter precursor was placed in a boron nitride crucible without a powder bed. The crucible was placed in a furnace and the wavelength converter precursor was heated in accordance with heating profile. More specifically, the wavelength converter precursor was initially heated from room temperature to 200 degrees Celsius at a rate of about 10 Celsius per minute and held for 20 minutes. Nitrogen gas was then introduced at a rate of 3 liters per minute and the temperature was increased to 1000 degrees Celsius at a rate of 10 Celsius per minute. The temperature was held at 1000 degrees Celsius for 10 minutes, and was then raised to 1450 degrees Celsius at a rate of 10 Celsius per minute. The temperature was held at 1450 degrees Celsius for 10 minutes, and was then raised to a peak temperature of 1600 degrees Celsius at a rate of 10 degrees Celsius per minute. The peak temperature was held for 60 minutes while the flow of nitrogen gas was maintained. The resulting sintered article was cooled to room temperature, resulting in the formation of a wavelength converter having a density of about 94% of the theoretical density of the materials used in the converter precursor.

Example 2

In this example a wavelength converter was produced by sintering a wavelength converter precursor using a spark plasma sintering (SPS) process. To produce the wavelength converter precursor a blend of 75% by volume of β-SiAlON particles as a wavelength conversion material and 25% by volume of yttrium aluminum garnet (YAG) as a sintering aid was formed. The β-SiAlON particles had an aspect ratio of ranging from about 1:1 to about 20:1 and a D50 particle size of about 0.5 to about 20 μm. The YAG particles had an aspect ratio of about 1:1 to about 5:1 and a D50 particle size of about 0.1 um to about 5 um. The blend was subject to uniaxial pressing at about 10 to about 35 MPa followed by wet-bag isopressing at about 100-200 MPa. The resulting wavelength converter precursor was in the form of a disk having a diameter of about 25 millimeters (mm) and a thickness of about 2 mm.

To produce a wavelength converter the wavelength converter precursor was placed in a graphite crucible and placed in a spark plasma sintering furnace. The wavelength converter precursor was then subject to mechanical pressure of 50 MPa as it was heated in the spark plasma sintering furnace at a temperature of 1560 degrees Celsius for 5 minutes in an atmosphere of nitrogen gas. The resulting sintered article was cooled to room temperature, resulting in the formation of a wavelength converter having a density of about 94% of the theoretical density of the materials used in the converter precursor.

The wavelength converters of examples 1 and 2 were tested to determine their optical properties. In particular, blue primary light was imparted on each wavelength converter and the secondary light emission, chromaticity (x and y according to the CIE 1931 color space) and conversion efficacy (CE) of each example was measured using housemade optical equipment. The emission spectrum of both examples is plotted in FIG. 4, and the full width half maximum (FWHM), chromaticity (x, y), dominant emission wavelength X and peak emission intensity Y values, and CE measurements of each example are provided in table 1 below.

TABLE 1

| Value | Example 1 (PLS) | Example 2 (SPS) |
|---|---|---|
| x | 0.3114 | 0.3175 |
| y | 0.5409 | 0.5716 |
| Dominant emission wavelength X (nm) | 540.1 | 539.5 |
| Peak emission intensity Y (W/nm) | $4.0 \times 10^{-5}$ | $2.5 \times 10^{-5}$ |
| FWHM (nm) | 50.3 | 49.8 |
| CE (lumens per watt - blue primary light) | 90.0 | 57.0 |

Figure 4:
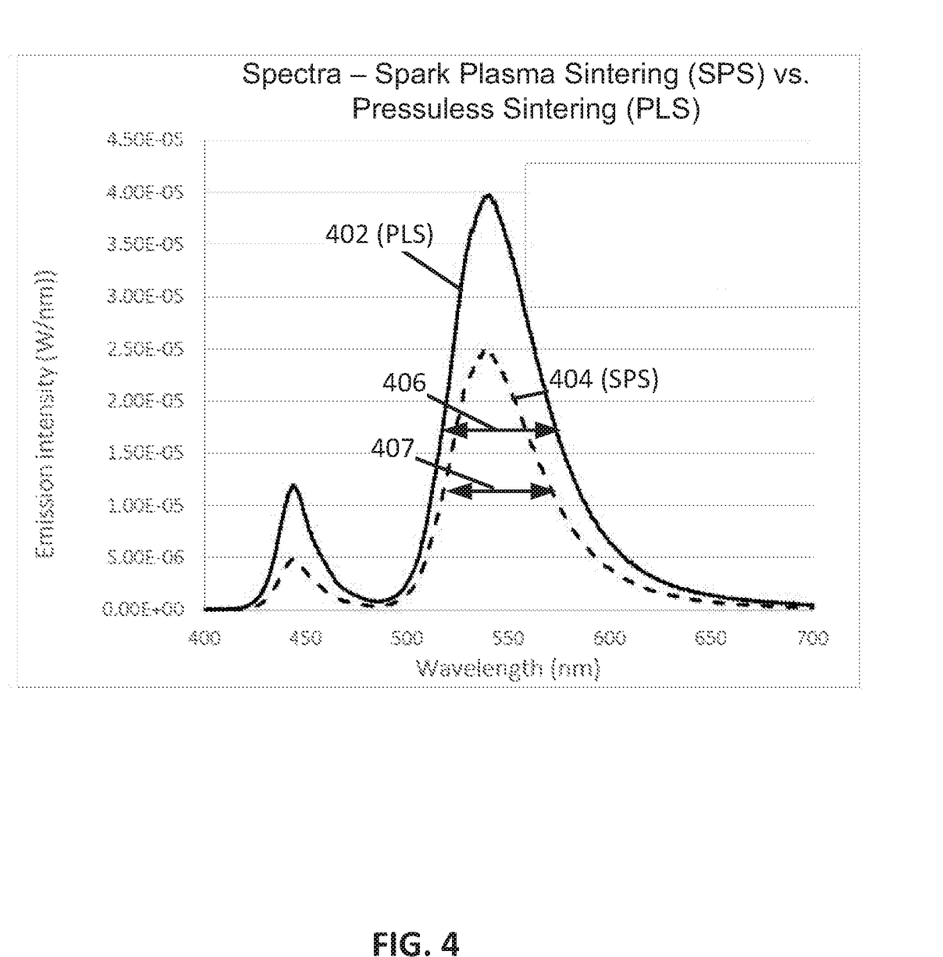
FIG. 4 is a plot showing secondary emission spectra for example wavelength converters that include only β-SiAlON as a wavelength conversion material, wherein the wavelength converters were formed via pressureless sintering (PLS) and spark plasma sintering (SPS), respectively.

As shown, the emission spectrum 402 of the first example (pressureless sintering) exhibited a peak in the range of 395-600 nm with a maximum emission intensity of about $4.0 \times 10^{-5}$ W/nm at about 540 nm, and a FWHM 406 of about 50 nm. In contrast, the emission spectrum 404 of the second example (spark plasma sintering) exhibited a peak in the range of 395-600 nm with a maximum emission intensity of about $2.5 \times 10^{-5}$ W/nm at about 540 nm, and a FWHM 407 of about 49.8 nm.

EMBODIMENTS

The following are additional non-limiting embodiments of the present disclosure.

Embodiment 1: According to this embodiment there is provided a method for producing a wavelength converter including sintering a mixture consisting essentially of first particles and second particles to form a sintered article; wherein the first particles consist essentially of particles of β-SiAlON or particles of one or more precursors of the β-SiAlON; the second particles consist essentially of particles of a sintering aid or particles of one or more precursors of the sintering aid; the sintered article has a density that is greater than or equal to about 90% of a theoretical bulk density of the mixture of first particles and second particles; and the sintered article is configured to convert primary light incident thereon to secondary light, wherein the secondary light exhibits a peak with a full width half maximum of greater than 0 to about 60 nanometers (nm) within a wavelength range of about 495 nm to about 600 nm.

Embodiment 2: This embodiment may include any or all of the features of embodiment 1, wherein the second particles consist essentially of particles of a sintering aid, wherein the sintering aid is of the formula $M_xN_y$, where M is selected from the group consisting of lithium (Li), sodium (Na), potassium (K), beryllium (Be); magnesium (Mg), calcium (Ca), strontium (Sr), barium (Ba), boron (B), aluminum (Al), gallium, yttrium, or a combination thereof, N is selected from the group consisting of fluorine (F), chlorine (Cl), oxygen (O), nitrogen (N), or a combination thereof, x is an integer, and y is an integer.

Embodiment 3: This embodiment may include any or all of the features of embodiments 1 or 2, wherein the sintering aid is selected from the group consisting of yttrium aluminum garnet ($Y_3Al_5O_{12}$), GdAG, LuAG, spinel ($MgAl_2O_4$), or a combination thereof.

Embodiment 4: This embodiment may include any or all of the features of any one of embodiments 1-3, wherein the second particles consist essentially of particles of one or more precursors of the sintering aid, and the sintering aid comprises $Y_3Al_5O_{12}$, $MgAl_2O_4$ or a combination thereof.

Embodiment 5: This embodiment may include any or all of the features of any one of embodiments 1-4, wherein the second particles consist essentially of particles of the sintering aid, and the sintering aid comprises $Y_3Al_5O_{12}$, $MgAl_2O_4$ or a combination thereof.

Embodiment 6: This embodiment may include any or all of the features of any one of embodiments 1-5, wherein the sintering comprises subjecting the mixture to a pressureless sintering process or a spark plasma sintering process.

Embodiment 7: This embodiment may include any or all of the features of embodiment 6, wherein the sintering comprises subjecting the mixture to a pressureless sintering process that includes heating the mixture either in the form of loose powder or powder compact to a peak temperature ranging from 1580 to 1750 degrees Celsius for about 10 to about 300 minutes to form the sintered article; and cooling the sintered article to room temperature.

Embodiment 8: This embodiment may include any or all of the features of embodiment 6, wherein the sintering comprises subjecting the mixture to a spark plasma sintering process that includes heating the mixture either in the form of loose powder or mixture compact in a conductive die to a peak temperature in a range of about 1500 to about 1670 degrees Celsius for about 2 to about 30 minutes while a pulsed direct current is applied to the conductive die and about 10 to about 50 megapascals (MPa) of mechanical pressure is applied to the mixture, so as to form the sintered article; and cooling the sintered article to room temperature.

Embodiment 9: This embodiment may include any or all of the features of embodiment 8, wherein the heating is performed in an atmosphere of nitrogen ($N_2$) gas, forming gas, or a combination thereof, wherein the forming gas comprises about 2 volume % hydrogen ($H_2$) and about 98 volume % nitrogen ($N_2$).

Embodiment 10: This embodiment may include any or all of the features of any one of embodiments 1 to 9, wherein the mixture includes an amount, X, of the first particles and an amount, Y, of the second particles; X ranges from about 5 to about 95 volume percent; and X+Y equals 100 volume percent of the mixture.

Embodiment 11: This embodiment may include any or all of the features of any one of embodiments 1 to 10, wherein the first particles are particles of a β-SiAlON and X ranges from about 30 to about 70 volume percent.

Embodiment 12: This embodiment may include any or all of the features of any one of embodiments 1-11, wherein the first particles have an average particle size (D50) ranging from about 0.5 micron to about 50 microns, and the second particles have an average particle size ranging from about 100 nanometers to about 5 microns.

Embodiment 13: This embodiment may include any or all of the features of any one of embodiments 1-12, wherein the β-SiAlON is of the formula $Si_{6-z}Al_zO_zN_{8-z}$, where z ranges from greater than 0 to less than or equal to 4.2; the sintering aid is $Y_3Al_5O_{12}$, $MgAl_2O_4$ or a combination thereof; the mixture comprises an amount, X, of the first particles and an amount, Y, of the second particles, wherein X ranges from greater than or equal to about 5 volume percent and X+Y equals 100 volume percent; and the sintering comprises subjecting the mixture to a pressureless sintering process or a spark plasma sintering process.

Embodiment 14: This embodiment may include any or all of the features of embodiment 13, wherein the sintering comprises subjecting the mixture to a pressureless sintering process that includes heating the mixture or a compact thereof to a peak temperature ranging from 1580 to 1750 degrees Celsius for about 10 to about 300 minutes to form the sintered article; and cooling the sintered article to room temperature.

Embodiment 15: This embodiment may include any or all of the features of embodiment 13, wherein the sintering comprises subjecting the mixture to a spark plasma sintering process that includes heating the mixture or a compact thereof to a peak temperature in a range of about 1500 to about 1670 degrees Celsius for about 2 to about 30 minutes while a pulsed direct current is applied to the conductive die and about 10 to about 50 megapascals (MPa) of mechanical pressure is applied to the powder mixture or to the compact, so as to form the sintered article; and cooling the sintered article to room temperature.

Embodiment 16: According to this embodiment there is provided a method for producing a wavelength converter, comprising: sintering a mixture consisting essentially of first particles and second particles to form a sintered article; wherein the first particles consist essentially of particles of β-SiAlON or particles of one or more precursors of the β-SiAlON; the second particles consist essentially of particles of a sintering aid or particles of one or more precursors of the sintering aid; the sintered article has a density that is greater than or equal to about 90% of a theoretical bulk density of the mixture of first particles and second particles; and the sintered article is configured to convert primary light incident thereon to secondary light, wherein the secondary light exhibits a peak with a full width half maximum of greater than 0 to about 60 nanometers (nm) within a wavelength range of about 495 nm to about 600 nm, wherein said sintering comprises subjecting said mixture to spark plasma sintering or pressureless sintering.

Embodiment 17: This embodiment may include any or all of the features of embodiment 16, wherein the second particles consist essentially of particles of a sintering aid, wherein the sintering aid is of the formula $M_xN_y$, where M is selected from the group consisting of lithium (Li), sodium (Na), potassium (K), beryllium (Be); magnesium (Mg), calcium (Ca), strontium (Sr), barium (Ba), boron (B), aluminum (Al), gallium, yttrium, or a combination thereof, N is selected from the group consisting of fluorine (F), chlorine (Cl), oxygen (O), nitrogen (N), or a combination thereof, x is an integer, and y is an integer.

Embodiment 18: This embodiment may include any or all of the features of embodiments 16 or 17, wherein the sintering aid is selected from the group consisting of yttrium aluminum garnet ($Y_3Al_5O_{12}$), GdAG, LuAG, spinel ($MgAl_2O_4$), or a combination thereof.

Embodiment 19: This embodiment may include any or all of the features of any one of embodiments 16-18, wherein the second particles consist essentially of particles of one or more precursors of the sintering aid, and the sintering aid comprises $Y_3Al_5O_{12}$, $MgAl_2O_4$ or a combination thereof.

Embodiment 20: This embodiment may include any or all of the features of any one of embodiments 16-19, wherein the second particles consist essentially of particles of the sintering aid, and the sintering aid comprises $Y_3Al_5O_{12}$, $MgAl_2O_4$ or a combination thereof.

Embodiment 21: This embodiment may include any or all of the features of embodiment 16, wherein the sintering comprises subjecting the mixture to a pressureless sintering process that includes heating the mixture either in the form of loose powder or powder compact to a peak temperature ranging from 1580 to 1750 degrees Celsius for about 10 to about 300 minutes to form the sintered article; and cooling the sintered article to room temperature.

Embodiment 22: This embodiment may include any or all of the features of embodiment 16, wherein the sintering comprises subjecting the mixture to a spark plasma sintering process that includes heating the mixture either in the form of loose powder or mixture compact in a conductive die to a peak temperature in a range of about 1500 to about 1670 degrees Celsius for about 2 to about 30 minutes while a pulsed direct current is applied to the conductive die and about 10 to about 50 megapascals (MPa) of mechanical pressure is applied to the mixture, so as to form the sintered article; and cooling the sintered article to room temperature.

Embodiment 23: This embodiment may include any or all of the features of embodiment 22, wherein the heating is performed in an atmosphere of nitrogen ($N_2$) gas, forming gas, or a combination thereof, wherein the forming gas comprises about 2 volume % hydrogen ($H_2$) and about 98 volume % nitrogen ($N_2$).

Embodiment 24: This embodiment may include any or all of the features of any one of embodiments 16-23, wherein the mixture includes an amount, X, of the first particles and an amount, Y, of the second particles; X ranges from about 5 to about 95 volume percent; and X+Y equals 100 volume percent of the mixture.

Embodiment 25: This embodiment may include any or all of the features of any one of embodiments 16-24, wherein the first particles are particles of a β-SiAlON and X ranges from about 30 to about 70 volume percent.

Embodiment 26: This embodiment may include any or all of the features of any one of embodiments 16-25, wherein the first particles have an average particle size (D50) ranging from about 0.5 micron to about 50 microns, and the second particles have an average particle size ranging from about 100 nanometers to about 5 microns.

Embodiment 27: This embodiment may include any or all of the features of any one of embodiments 16-26, wherein the β-SiAlON is of the formula $Si_{6-z}Al_zO_zN_{8-z}$, where z ranges from greater than 0 to less than or equal to 4.2; the sintering aid is $Y_3Al_5O_{12}$, $MgAl_2O_4$ or a combination thereof; the mixture comprises an amount, X, of the first particles and an amount, Y, of the second particles, wherein X ranges from greater than or equal to about 5 volume percent and X+Y equals 100 volume percent; and the sintering comprises subjecting the mixture to a pressureless sintering process or a spark plasma sintering process.

Embodiment 26: This embodiment may include any or all of the features of embodiment 27, wherein the sintering comprises subjecting the mixture to a pressureless sintering process that includes heating the mixture or a compact thereof to a peak temperature ranging from 1580 to 1750 degrees Celsius for about 10 to about 300 minutes to form the sintered article; and cooling the sintered article to room temperature.

Embodiment 27: This embodiment may include any or all of the features of embodiment 27, wherein the sintering comprises subjecting the mixture to a spark plasma sintering process that includes heating the mixture or a compact thereof to a peak temperature in a range of about 1500 to about 1670 degrees Celsius for about 2 to about 30 minutes while a pulsed direct current is applied to the conductive die and about 10 to about 50 megapascals (MPa) of mechanical pressure is applied to the powder mixture or to the compact, so as to form the sintered article; and cooling the sintered article to room temperature.

Embodiment 28: This embodiment may include any or all of the features of any one of embodiments 1 to 9 or 16 to 23, wherein the mixture includes an amount Y, of the second particles, wherein Y is at least about 30 volume.

Embodiment 29: This embodiment may include any or all of the features of any one of embodiments 1 to 9 or 16-23, and 28, wherein the mixture includes an amount, X, of the first particles, wherein X from about 30 to about 70 volume percent.

Embodiment 30: This embodiment may include any or all of the features of any one of embodiments 1 to 9 or 16-23, and 29 wherein the mixture includes an amount, X, of the first particles, wherein X from about 30 to about 70 volume percent.

Embodiment 31: This embodiment may include any or all of the features of any one of embodiments 28-30, wherein X+Y equals 100 volume percent.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

| Table of Reference Numerals and Elements | |
|---|---|
| Element | Reference Numeral |
| wavelength converter | 100 |
| Method of forming a wavelength converter | 200 |
| Method blocks | 201-211 |
| lighting device | 300 |
| light source | 302 |
| wavelength converter | 304 |
| primary light | 306 |
| light emitting surface | 307 |
| secondary light | 308 |
| emission spectrum | 402 |
| emission spectrum | 404 |
| FWHM | 406 |
| FWHM | 407 |

What is claimed is:

1. A method, comprising:
    sintering a mixture consisting essentially of first particles and second particles to form a sintered article; and
    providing the sintered article on a light source as a wavelength converter;
    wherein said first particles consist essentially of particles of β-SiAlON or particles of one or more precursors of said β-SiAlON;
    wherein said second particles consist essentially of particles of at least one sintering aid wherein said at least one sintering aid is yttrium aluminum garnet ($Y_3Al_5O_{12}$), spinel ($MgAl_2O_4$) or a combination thereof;
    wherein said sintered article has a density that is greater than or equal to about 90% of a theoretical bulk density of said mixture of first particles and second particles;
    wherein said sintered article is configured to convert primary light incident thereon to secondary light, wherein said secondary light exhibits a peak with a full width half maximum of greater than 0 to about 60 nanometers (nm) within a wavelength range of about 495 nm to about 600 nm; and
    wherein the light source is configured to emit primary light for at least partial conversion into the secondary light by the sintered article.

2. The method of claim 1, wherein said at least one sintering aid comprises the combination of $Y_3Al_5O_{12}$ and $MgAl_2O_4$.

3. The method of claim 1, wherein said sintering comprises subjecting said mixture to a pressureless sintering process.

4. The method of claim 3, wherein said sintering comprises subjecting said mixture to a pressureless sintering process that comprises:
    heating said mixture to a peak temperature ranging from 1580 to 1750 degrees Celsius for about 10 to about 300 minutes to form said sintered article;
    and cooling said sintered article to room temperature.

5. The method of claim 1, wherein said sintering comprises subjecting said mixture to a spark plasma sintering process that comprises:

heating said mixture in conductive die to a peak temperature in a range of about 1500 to about 1670 degrees Celsius for about 2 to about 30 minutes while a pulsed direct current is applied to said conductive die and about 10 to about 50 megapascals (MPa) of mechanical pressure is applied to said mixture, so as to form said sintered article; and cooling said sintered article to room temperature.

6. The method of claim 5, wherein said heating is performed in an atmosphere of nitrogen ($N_2$) gas, forming gas, or a combination thereof, wherein said forming gas comprises about 2 volume % hydrogen ($H_2$) and about 98 volume % nitrogen ($N_2$).

7. The method of claim 1, wherein:

said mixture includes an amount, X, of said first particles and an amount, Y, of said second particles;

X ranges from about 5 to about 95 volume percent.

8. The method of claim 7, wherein said first particles are particles of a β-SiAlON and X ranges from about 30 to about 70 volume percent.

9. The method of claim 1, wherein said first particles have an average particle size (D50) ranging from about 0.5 micron to about 50 microns, and said second particles have an average particle size ranging from about 100 nanometers to about 5 microns.

10. The method of claim 1, wherein:

said β-SiAlON is of the formula $Si_{6-z}Al_zO_zN_{8-z}$, where z ranges from greater than 0 to less than or equal to 4.2;

the at least one sintering aid is $Y_3Al_5O_{12}$, $MgAl_2O_4$ or a combination thereof;

said mixture comprises an amount, X, of said first particles and an amount, Y, of said second particles, wherein X ranges from greater than or equal to about 5 volume percent and X+Y equals wo volume percent; and said sintering comprises subjecting said mixture to a pressureless sintering process or a spark plasma sintering process.

11. The method of claim 10, wherein said sintering comprises subjecting said mixture to a pressureless sintering process that comprises:

heating said mixture to a peak temperature ranging from 1580 to 1750 degrees Celsius for about 10 to about 300 minutes to form said sintered article; and cooling said sintered article to room temperature.

12. The method of claim 10, wherein said sintering comprises subjecting said mixture to a spark plasma sintering process that comprises:

heating said mixture in a conductive die to a peak temperature in a range of about 1500 to about 1670 degrees Celsius for about 2 to about 30 minutes while a pulsed direct current is applied to said conductive die and about 10 to about 50 megapascals (MPa) of mechanical pressure is applied to said mixture, so as to form said sintered article; and cooling said sintered article to room temperature.

13. The method of claim 1, wherein said mixture contains at least 30% by volume of said second particles.

14. The method of claim 1, wherein the light source is a light emitting diode (LED).

15. The method of claim 14, wherein the sintered article is provided as the wavelength converter directly on a light exit surface of the LED, and wherein the LED is configured to emit the primary light at the light exit surface for at least partial conversion into the secondary light by the sintered article.

16. The method of claim 14, wherein the LED is an indium gallium nitride (InGaN) LED.

* * * * *